United States Patent

Zeevi et al.

Patent Number: 5,467,123
Date of Patent: Nov. 14, 1995

[54] APPARATUS & METHOD FOR ENHANCING COLOR IMAGES

[75] Inventors: Yehoshua Y. Zeevi, Haifa; Ran Ginosar, Nofit, both of Israel; Wolf Stuart, Johannesbourg, South Africa

[73] Assignee: Technion Research and Development Foundation, Ltd., Haifa, Israel

[21] Appl. No.: 69,719

[22] Filed: Jun. 1, 1993

[30] Foreign Application Priority Data

Nov. 16, 1992 [IL] Israel ......... 103763

[51] Int. Cl.$^6$ ......... H04N 9/43
[52] U.S. Cl. ......... 348/34; 348/62
[58] Field of Search ......... 348/30, 32, 34, 348/62, 341, 345, 649, 630; 382/17, 54; H04N 9/43

[56] References Cited

U.S. PATENT DOCUMENTS

| | | |
|---|---|---|
| 4,752,827 | 6/1988 | Cassagne et al. . |
| 4,897,717 | 7/1990 | Hamilton et al. ......... 348/404 |
| 4,980,760 | 12/1990 | Hiratsuka et al. . |
| 4,984,072 | 1/1991 | Sandrew ......... 348/34 |
| 5,079,621 | 7/1992 | Daly et al. ......... 348/396 |
| 5,125,046 | 6/1992 | Siwoff ......... 348/28 |
| 5,182,639 | 1/1993 | Jutamulia et al. ......... 348/34 |
| 5,267,331 | 11/1993 | Siwoff ......... 348/62 |

OTHER PUBLICATIONS

Wysecki, G. and Stiles, W. S., "Color Science: Concepts and Methods, Quantitiative Data and Formulae", John Sons, 1982.
Gonzalez, R. C. and Wintz, P., "Digital Image Processing", Addison–Wesley, 1987, pp. 122–130.
Rushton, W. A. H., "Visual Pigments and Color Blindness", Scientific American, vol. 232(3), Mar. 1975, pp. 64–74.
Rosenfeld, A. and Kak, A. C., "Digital Picture Processing", Academic Press, 1982.

Primary Examiner—Victor R. Kostak
Attorney, Agent, or Firm—Conley, Rose & Tayon

[57] ABSTRACT

Color image enhancement apparatus comprising apparatus for receiving signals representing a color image, image processing apparatus, employing the received signals, for image processing of the high spatial frequency chromatic components of a color image, and apparatus for providing a color image from the output of said image processing apparatus.

60 Claims, 2 Drawing Sheets

APPARATUS & METHOD FOR ENHANCING COLOR IMAGES

FIELD OF THE INVENTION

The present invention relates to image processing generally and more particularly to detail enhancement in color images.

BACKGROUND OF THE INVENTION

Color image processing is discussed generally in the following texts, the disclosures of which are hereby incorporated by reference:

Rosenfeld, A. and Kak, A. C. *Digital picture processing*, Academic Press, 1982, and Wysecki, G. and Stiles, W. S., *Color science: concepts and methods, quantitiative data and formulae*, John Wiley and Sons, 1982.

SUMMARY OF THE INVENTION

The present invention seeks to provide an improved system for enhancing color images which is based on an adaptive opponent color model.

The present invention also seeks to provide a system for enhancing color images which takes into account properties of the human visual system (HVS).

The present invention also seeks to provide a system for adapting a color image for perception by color blind individuals.

There is thus provided, in accordance with a preferred embodiment of the present invention, color image enhancement apparatus including apparatus for receiving signals representing a color image, image processing apparatus, employing the received signals, for image processing of the high spatial frequency chromatic components of the color image, and apparatus for providing a color image using the output of the image processing apparatus.

Further in accordance with a preferred embodiment of the present invention, the apparatus for providing a color image also employs an achromatic component of the color image which was not processed by the image processing apparatus.

Still further in accordance with a preferred embodiment of the present invention, the apparatus for providing a color image also employs an achromatic component of the color image which was processed by the image processing apparatus.

Still further in accordance with a preferred embodiment of the present invention, the apparatus for providing a color image also employs an achromatic component of the color image.

Additionally in accordance with a preferred embodiment of the present invention, the apparatus for receiving includes apparatus for receiving signals representing a color image in a first color space, and apparatus for transforming the received signals from the first color space into a color space which simulates the cones of the human visual system.

Further in accordance with a preferred embodiment of the present invention, the first color space includes an RGB space and the cone-simulating color space includes a $(V_l, V_m, V_s)$ color space.

Additionally in accordance with a preferred embodiment of the present invention, the apparatus for providing includes apparatus for transforming the output of the image processing apparatus from the cone-simulating color space to a second color space.

Still further in accordance with a preferred embodiment of the present invention, the second color space includes an RGB space.

Additionally in accordance with a preferred embodiment of the present invention, the apparatus for receiving includes apparatus for at least partially decorrelating signals representing the color image.

Further in accordance with a preferred embodiment of the present invention, the apparatus for decorrelating includes apparatus for performing a Karhunen-Loeve transform.

Still further in accordance with a preferred embodiment of the present invention, the apparatus for providing includes apparatus for performing an inverse of the Karhunen-Loeve transform.

There is also provided, in accordance with another preferred embodiment of the present invention, color image enhancement apparatus including apparatus for image processing of the high spatial frequency chromatic components of a color image.

There is further provided, in accordance with another preferred embodiment of the present invention, color image enhancement apparatus including apparatus for image processing of the high spatial frequency chromatic components of a color image, whereby a resulting enhanced color image is produced at least mainly from the high spatial frequency components.

Further in accordance with a preferred embodiment of the present invention, the high spatial frequency components are those contained in the top half, top third, or top quarter of the spatial frequency range of the color image.

Further in accordance with a preferred embodiment of the present invention, the power spectrum of the high spatial frequency chromatic components is similar to that of a high spatial frequency achromatic component of the color image.

There is also provided, in accordance with yet a further preferred embodiment of the present invention, color image enhancement apparatus for modifying a color image for perception by a color-blind individual, the apparatus including apparatus for receiving signals representing the color image, image processing apparatus including apparatus, employing the received signals, for modifying the color image such that at least one color in the color image which a color-blind individual cannot differentiate is transformed to at least one color which the color-blind individual can differentiate, and apparatus for providing a color image using the output of the image processing apparatus.

Further in accordance with a preferred embodiment of the present invention, apparatus for identifying at least one color which the color-blind individual does not differentiate is also provided.

Further in accordance with a preferred embodiment of the present invention, the apparatus for modifying includes apparatus, employing the received signals, for modifying the color image such that a color in the color image which a dichromate does not differentiate is transformed to at least one color which the dichromate can differentiate.

Still further in accordance with a preferred embodiment of the present invention, the apparatus for apparatus, employing the received signals, for modifying the color image such that at least one color in the color image which a monochromate does not differentiate is transformed to a color which the monochromate can differentiate.

Additionally in accordance with a preferred embodiment of the present invention, the image processing apparatus includes apparatus for enhancing chromatic differences between spatially adjacent colors.

Further in accordance with a preferred embodiment of the present invention, the apparatus for enhancing chromatic differences includes apparatus for enhancing chromatic differences between spatially adjacent colors which are achromatically indifferentiable.

Still further in accordance with a preferred embodiment of the present invention, the apparatus for enhancing chromatic differences includes apparatus for enhancing chromatic differences between spatially adjacent colors which are achromatically differentiable.

Additionally in accordance with a preferred embodiment of the present invention, apparatus is also provided for enhancing primarily a high spatial frequency portion of an achromatic component of the color image.

Further in accordance with a preferred embodiment of the present invention, apparatus is also provided for enhancing in the presence of noise including apparatus for enhancing primarily a low spatial frequency portion of an achromatic component of the color image.

There is also provided, in accordance with another preferred embodiment of the present invention, a method for color image enhancement including the steps of receiving signals representing a color image, employing the received signals for image processing of the high spatial frequency chromatic components of the color image, and providing a color image using the output of the apparatus for image processing.

Further in accordance with a preferred embodiment of the present invention, the step of providing a color image also employs an achromatic component of the color image which was not processed in the image processing step.

Still further in accordance with a preferred embodiment of the present invention, the step of providing a color image also employs an achromatic component of the color image which was processed in the image processing step.

Additionally in accordance with a preferred embodiment of the present invention, the step of providing a color image also employs an achromatic component of the color image.

Further in accordance with a preferred embodiment of the present invention, the step of receiving includes the steps of receiving signals representing a color image in a first color space, and transforming the received signals from the first color space into a color space which simulates the cones of the human visual system.

Still further in accordance with a preferred embodiment of the present invention, the first color space includes an RGB space and the cone-simulating color space includes a ($V_l$, $V_m$, $V_s$) color space.

Further in accordance with a preferred embodiment of the present invention, the step of providing includes the step of transforming the output of the employing step from the cone-simulating color space to a second color space.

Still further in accordance with a preferred embodiment of the present invention, the second color space includes an RGB space.

Additionally in accordance with a preferred embodiment of the present invention, the step of receiving includes the step of at least partially decorrelating signals representing the color image.

Further in accordance with a preferred embodiment of the present invention, the step of decorrelating includes the step of performing a Karhunen-Loeve transform.

Still further in accordance with a preferred embodiment of the present invention, the step of providing includes the step of performing an inverse of the Karhunen-Loeve transform.

There is also provided, in accordance with another preferred embodiment of the present invention, a color image enhancement method including the step of image processing of the high spatial frequency chromatic components of a color image.

There is further provided, in accordance with another preferred embodiment of the present invention, a color image enhancement method including the step of image processing of the high spatial frequency chromatic components of a color image, whereby a resulting enhanced color image is produced at least mainly from the high spatial frequency components.

Further in accordance with a preferred embodiment of the present invention, the high spatial frequency components include the top half, top third or top quarter of the spatial frequency range of the color image.

Still further in accordance with a preferred embodiment of the present invention, the power spectrum of the high spatial frequency chromatic components is similar to that of a high spatial frequency achromatic component of the color image.

Additionally in accordance with a preferred embodiment of the present invention, there is provided a color image enhancement method for modifying a color image for perception by a color-blind individual, the method including the steps of receiving signals representing the color image, image processing the color image, including the step of employing the received signals for modifying the color image such that at least one color in the color image which a color-blind individual cannot differentiate is transformed to at least one color which a color-blind individual can differentiate, and providing a color image using the output of the apparatus for image processing.

Further in accordance with a preferred embodiment of the present invention, the method also includes the step of identifying at least one color which the color-blind individual does not differentiate.

Still further in accordance with a preferred embodiment of the present invention, the step of employing includes the step of employing the received signals for modifying the color image such that a color in the color image which a dichromate does not differentiate is transformed to at least one color dichromate can differentiate.

Additionally in accordance with a preferred embodiment of the present invention, the step of employing includes the step of employing the received signals for modifying the color image such that at least one color in the color image which a monochromate does not differentiate is transformed to a color which the monochromate can differentiate.

Further in accordance with a preferred embodiment of the present invention, the step of image processing includes the step of enhancing chromatic differences between spatially adjacent colors.

Still further in accordance with a preferred embodiment of the present invention, the step of enhancing chromatic differences includes the step of enhancing chromatic differences between spatially adjacent colors which are achromatically indifferentiable.

Still further in accordance with a preferred embodiment of the present invention, the step of enhancing chromatic differences includes the step of enhancing chromatic differences between spatially adjacent colors which are achromatically differentiable.

Additionally in accordance with a preferred embodiment of the present invention, the method includes the step of enhancing primarily a high spatial frequency portion of an achromatic component of the color image.

Still further in accordance with a preferred embodiment of the present invention, the method includes a step of enhancing in the presence of noise including the step of enhancing primarily a low spatial frequency portion of an achromatic component of the color image.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
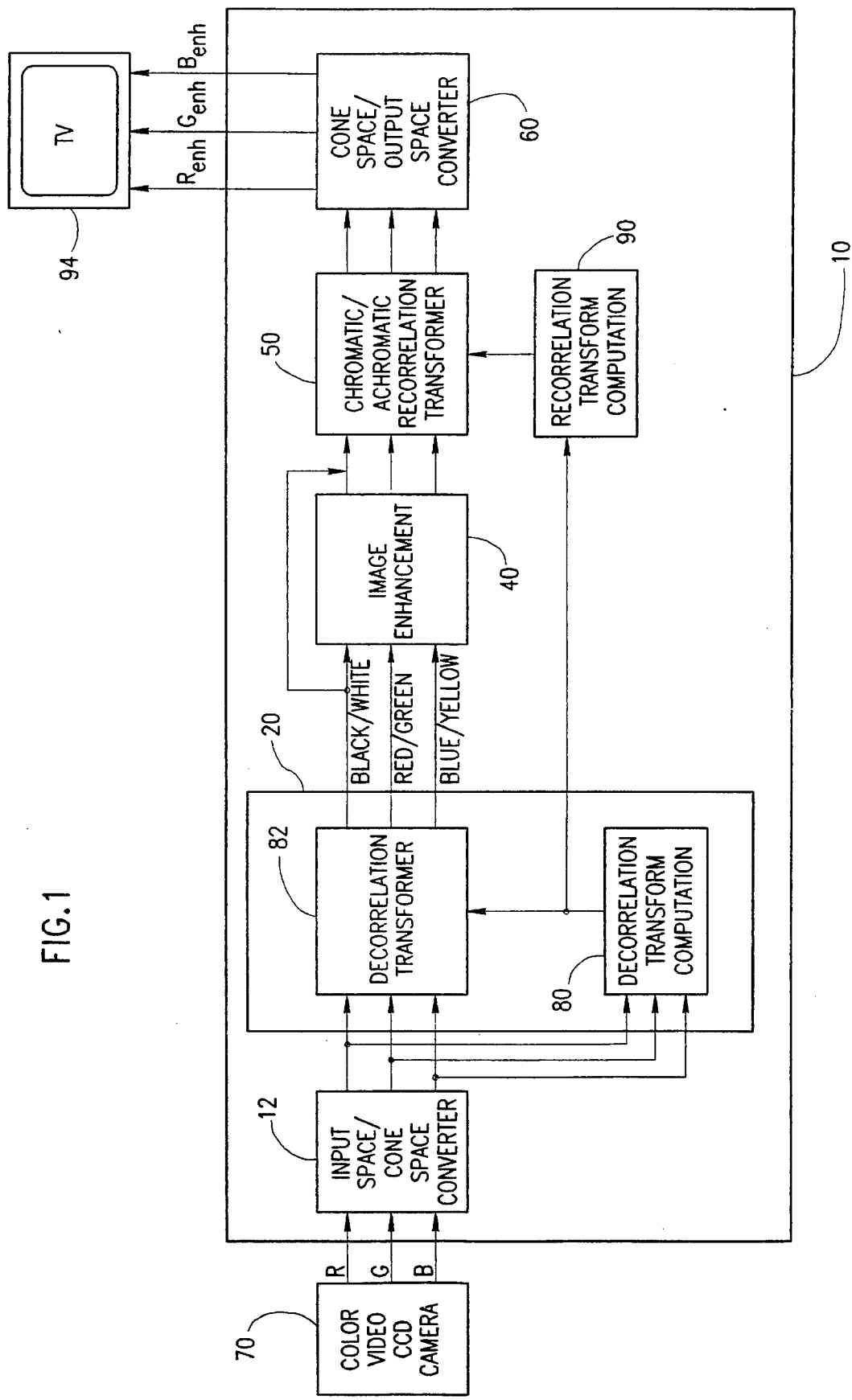
FIG. 1 is a simplified block diagram of image enhancement apparatus constructed and operative in accordance with a first preferred embodiment of the present invention.

Reference is now made to FIG. 1 which illustrates image enhancement apparatus 10 constructed and operative in accordance with a first preferred embodiment of the present invention.

Image enhancement apparatus 10 comprises an input space/cone space converter 12, a decorrelator 20, an image enhancement unit 40, a chromatic/achromatic recorrelator 50 and a cone space/output space converter 60.

The image enhancement apparatus 10 receives signals representing a color image in a color space such as RGB or $YC_rC_b$. The source of these signals may, for example, be a color video CCD camera 70.

Preferably, the input signals are converted by input space/cone space converter 12 to a representation similar to that employed by HVS cones, which are biological retinal receptors. One example of a cone-simulating color space is a ($V_l$, $V_m$, $V_s$) space, as know in the art. However, any other suitable cone-simulating color space may be employed.

The output of input space/cone space converter 12 is provided to decorrelator 20 which is operative to reduce the correlations between the plurality of components of the output of converter 12.

According to a preferred embodiment of the present invention, decorrelator 20 is based upon the Karhunen-Loeve transform (KLT), which is described in the following publication, the disclosure of which is incorporated herein by reference:

Gonzalez, R. C. and Wintz, P. *Digital image. processing*, Addison-Wesley, 1987, pp. 122–130.

Decorrelator 20 preferably comprises a decorrelation transform computation unit 80 and a decorrelation transformer 82. Decorrelation transform computation unit 80 computes the transformation to be applied to the output of converter 12, as described in more detail below after the discussion of FIG. 2. Decorrelation transformer 82 applies the transformation to the converter 12 output.

Alternatively, decorrelation transform computation unit 80 may be eliminated. Instead, a KLT transform may be precomputed based on a sample of images which is preferably representative of the type of images for which it is desired to employ the apparatus of FIG. 1. For example, as explained in more detail below after the discussion of FIG. 2, a KLT transform suitable for daylight landscapes may be computed based upon a suitable sample including a variety of daylight landscapes.

In the illustrated embodiment, the components of the output of decorrelator 20, preferably comprising cone-simulating, decorrelated image data, are labelled black/white, red/green and blue/yellow, respectively, to facilitate and intuitive and rapid understanding of the present invention. However, it is appreciated that the output channels of decorrelator 20 may not, in fact, correspond exactly to this verbal description.

The cone-simulating, decorrelated image data, also termed herein ($K_1$, $K_2$, $K_3$), is provided to image enhancement unit 40. A particular feature of the present invention is that image enhancement unit 40 preferably processes high spatial frequency chromatic components of the color image data and that the color image data output by image enhancement unit 40 is preferably produced mainly or entirely by processing of the high spatial frequency chromatic components.

In the present specification, the term "high spatial frequency chromatic components" refers to chromatic components whose spatial frequency is included in the top half, third or quarter, on a log scale, of the spatial frequency range of the entire color image. For example, if the size of the color image is 512 pixels×512 pixels, the maximum spatial frequency along a particular dimension of the color image is 512/2=256 cycles per image, and any of the following categories of chromatic components may be regarded as "high spatial frequency chromatic components":

"top half" chromatic components whose spatial frequency is greater than $256^{1/2}$=16 cycles per image;

"top third" chromatic components whose spatial frequency is greater than $256^{2/3}$=approximately 40 cycles per image; and "top quarter" chromatic components whose spatial frequency is greater than $256^{3/4}$=64 cycles per image.

Alternatively, the term "high spatial frequency chromatic components" refers to those chromatic components having a power spectrum resembling the power spectrum of high spatial frequency achromatic components of the color image. The term "high spatial frequency achromatic components" may be defined analogously to the previous definitions in which "high spatial frequency chromatic components" were defined independent of achromatic components.

An operational definition of the term "high spatial frequency chromatic components" in applications in which high-pass achromatic enhancement is provided, is those chromatic components which survive filtering with the same high-pass filters employed for the achromatic enhancement.

Preferably, color enhancement unit 40 is operative to enhance details in the color image by enhancing chromatic differences between spatially adjacent colors which may or may not be achromatically differentiable.

Preferably, the color enhancement unit 40 is also operative to process achromatic components of the color image. According to one alternative embodiment of the present invention, primarily the high frequency portion of the achromatic components is processed.

Alternatively, the achromatic processing performed by color enhancement unit 40 primarily comprises processing of the low frequency portion of the achromatic components of the color image. This embodiment is particularly useful in the presence of strong noise, because empirical findings indicate that most of the noise occurs in the achromatic components.

Alternatively, in the presence of noise, even the low pass filtering of the achromatic components may be eliminated and processing may be restricted only to the chromatic components of the color image.

The output of color image enhancement unit 40 is provided to recorrelating unit 50 which performs the inverse of the transformation applied by decorrelating unit 82. The inverse transform is computed by inverse transform computation unit 90 which receives an indication of the original transform from decorrelating transform computation unit 80.

Alternatively, if decorrelating transform computation unit 80 is eliminated, as explained above, recorrelation transform computation unit 90 may be eliminated and the inverse transform employed by recorrelating unit 50 may be predetermined, using a representative set of color images, as explained above.

The output of recorrelating unit 50 is provided to cone space/output space converter 60 which is operative to convert the data from cone space representation to output space representation. Any suitable output space may be employed, such as the RGB space of a CRT. The output space may or may not be the same as the input space in which the data received by chromatic enhancement apparatus 10 is represented.

The output of the apparatus 10 is an enhanced color image, on any suitable medium such as a CRT 94.

A detailed description of computational features of the various components of the apparatus of FIG. 1 appears below after the discussion of FIG. 2.

It is appreciated that, in actual practice, many modifications are possible. For example, of course, instead of providing a sequence of units for performing a sequence of transformations on input color image data, a single unit may be provided which performs a single transformation which is the composition of the sequence of transformations. In other words, the result of applying the single transformation is the same as the result of sequentially applying the sequence of transformations.

Figure 2:
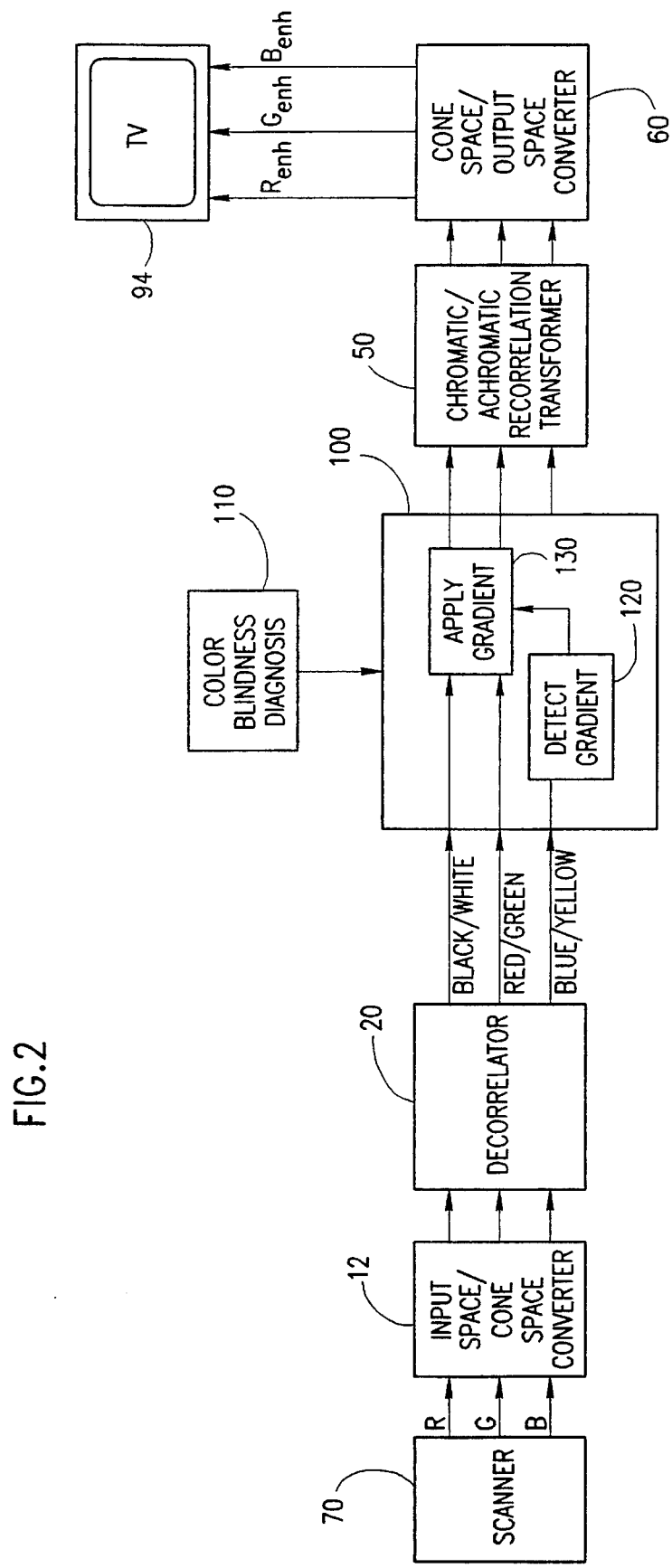
FIG. 2 is a simplified block diagram of image enhancement apparatus constructed and operative in accordance with a second preferred embodiment of the present invention.

Reference is now made to FIG. 2 which illustrates a system for adapting color images for perception by color blind individuals, and which is based on the apparatus described above with reference to FIG. 1. Substantially identical elements in FIGS. 1 and 2 are identically numbered for easy reference and are not described again hereinbelow for brevity.

In FIG. 2, a color image processing unit 100 is operative to "cross-enhance" at least one chromatic channel of the color image which is not perceived by a color blind individual using at least one other channel of the color image which is perceived by the color blind individual. For example, in the case of an individual who does not differentiate red/green, edges in the red/green channel will be enhanced in either or both of the blue/yellow and black/white channels.

A preferred method of operation for color image processing unit 100 is as follows:

a. Diagnose the type of color blindness of a target individual, preferably employing a computerized color blindness diagnosis system 110 interacting with the color blind individual. The computerized color blindness diagnosis system 110 is to determine which chromatic channels are not operative to determine which chromatic channels are not perceived and may be based on any suitable conventional testing materials for diagnosing color blindness. Color blindness diagnosis system 110 may, for example, be based upon the the following publication and the publications cited thereby, the disclosures of which are hereby incorporated by reference:

Rushton, W. A. H., "Visual pigments and color blindness", Scientific American, Vol. 232(3), March 1975, pp. 64–74.

Alternatively, the color blindess diagnosis information may be provided manually or from a memory in which color blindness diagnoses were prestored.

According to still a further alternative, the operation of image processing unit 100 may be customized to adapt color images for perception only by a predetermined type of color blind individual, such as a red/green color blind individual.

In the illustrated embodiment, the image processing unit 100 is illustrated as "cross-enhancing" the red/green channel by "transferring" red/green information to other channels, namely the blue/yellow channel and/or the achromatic channel. It is appreciated, however, that image processing unit 100 may be operative to "cross-enhance" any one or any subset of the channels received thereby.

b. A gradient computation unit 120 is employed to detect gradients in the red/green channel.

c. The detected gradients are transferred to the blue/yellow and/or achromatic channels by a gradient application unit 130. For example, the gradient or spatial derivative detected for the red/green channel is preferably multiplied by a calibrating constant and may then be added to either or both of the blue/yellow and black/white channels.

It will be appreciated by persons skilled in the art that the present invention is not limited to what has been particularly shown and described hereinabove. Rather, the scope of the present invention is defined only by the claims that follow:

We claim:

1. Color image enhancement apparatus comprising:

apparatus for receiving signals representing a color image;

image processing apparatus, employing the received signals, for image processing which operates directly on the high spatial frequency chromatic components of a color image; and apparatus for providing a color image from the output of said image processing apparatus.

2. Apparatus according to claim 1 wherein said apparatus for providing a color image also employs an achromatic component of the color image which was not processed by said image processing apparatus.

3. Apparatus according to claim 1 wherein said apparatus for providing a color image also employs an achromatic component of the color image which was processed by said image processing apparatus.

4. Apparatus according to claim 1 and wherein said apparatus for providing a color image also employs an achromatic component of the color image.

5. Apparatus according to claim 1 wherein said apparatus for receiving comprises:

apparatus for receiving signals representing a color image in a first color space; and apparatus for transforming the received signals from the first color space into a color space which simulates the cones of the human visual system.

6. Apparatus according to claim 5 wherein the first color space comprises an RGB space.

7. Apparatus according to claim 5 wherein the cone-simulating color space comprises a $(V_1, V_m, V_s)$ color space.

8. Apparatus according to claim 5 and wherein said apparatus for providing comprises apparatus for transforming the output of the image processing apparatus from the cone-simulating color space to a second color space.

9. Apparatus according to claim 8 wherein said second color space comprises an RGB space.

10. Apparatus according to claim 1 wherein the apparatus for receiving comprises apparatus for at least partially decorrelating signals representing the color image.

11. Apparatus according to claim 10 wherein said apparatus for decorrelating comprises apparatus for performing a Karhunen-Loeve transform.

12. Apparatus according to claim 11 wherein the apparatus for providing comprises apparatus for performing an inverse of the Karhunen-Loeve transform.

13. Color image enhancement apparatus according to claim 1 and wherein said high spatial frequency components comprise the top half of the spatial frequency range of the color image.

14. Color image enhancement apparatus according to claim 1 and wherein said high spatial frequency components comprise the top third of the spatial frequency range of the color image.

15. Color image enhancement apparatus according to claim 1 and wherein said high spatial frequency components comprise the top quarter of the spatial frequency range of the color image.

16. Color image enhancement apparatus according to claim 1 and wherein the power spectrum of said high spatial frequency chromatic components is similar to that of a high spatial frequency achromatic component of said color image.

17. Apparatus according to claim 1 wherein said image processing apparatus comprises apparatus for enhancing chromatic differences between spatially adjacent colors.

18. Apparatus according to claim 17 wherein said apparatus for enhancing chromatic differences comprises apparatus for enhancing chromatic differences between spatially adjacent colors which are achromatically indifferentiable.

19. Apparatus according to claim 17 wherein said apparatus for enhancing chromatic differences comprises apparatus for enhancing chromatic differences between spatially adjacent colors which are achromatically differentiable.

20. Apparatus according to claim 17 and also comprising apparatus for enhancing primarily a high spatial frequency portion of an achromatic component of the color image.

21. Apparatus according to claim 17 and also comprising apparatus for enhancing in the presence of noise comprising apparatus for enhancing primarily a low spatial frequency portion of an achromatic component of the color image.

22. Apparatus according to claim 1 wherein said image processing apparatus is operative to enhance said high spatial the Karhunen-Loeve transform.

23. Color image enhancement apparatus comprising:
an input means for receiving a color image signal apparatus for image processing which operates directly on the high spatial frequency chromatic components of a color image representing the input color image signal.

24. Apparatus according to claim 23 wherein said apparatus for image processing is operative to enhance said high spatial frequency chromatic components.

25. Color image enhancement apparatus comprising:
an input means for receiving a color image signal apparatus for image processing which operates directly on the high spatial frequency chromatic components of a color image representing the input color image signal, whereby a resulting enhanced color image is produced at least mainly from said high spatial frequency components.

26. Apparatus according to claim 25 wherein said apparatus for image processing is operative to enhance said high spatial frequency chromatic components.

27. Color image enhancement apparatus for modifying a color image for perception by a color-blind individual, the apparatus comprising:
apparatus for receiving signals representing the color image;
image processing apparatus comprising apparatus, employing the received signals, for modifying the color image such that at least one color in the color image which a color-blind individual cannot differentiate is transformed to at least one color which the color-blind individual can differentiate; and
apparatus for providing a color image using the output of said image processing apparatus,
wherein said image processing apparatus which operates directly on the high spatial frequency chromatic components of the color image for enhancement thereof.

28. Apparatus according to claim 27 and also comprising apparatus for identifying colors which the color-blind individual does not differentiate.

29. Apparatus according to claim 27 wherein said apparatus for modifying comprises apparatus, employing the received signals, for modifying a color image such that a color in the color image which a dichromate does not differentiate is transformed to at least one color which the dichromate can differentiate.

30. Apparatus according to claim 27 wherein said apparatus for modifying comprises apparatus, employing the received signals, for modifying the color image such that at least one color in the color image which a monochromate does not differentiate is transformed to a color which the monochromate can differentiate.

31. A method for color image enhancement comprising:
receiving signals representing a color image;
employing the received signals for image processing of the high spatial frequency chromatic components which operates directly the color image; and
providing a color image from the output of said employing step.

32. A method according to claim 31 wherein said providing a color image also employs an achromatic component of the color image which was not processed in said image processing.

33. A method according to claim 31 wherein said providing a color image also employs an achromatic component of the color image which was processed in said image processing.

34. A method according to claim 31 and where said providing a color image also employs an achromatic component of the color image.

35. A method according to claim 31 wherein said receiving comprises:
receiving signals representing thee color image in a first color space; and
transforming the received signals from the first color space into a color space which simulates the cones of the human visual system.

36. A method according to claim 35 wherein the first color space comprises an RGB space.

37. A method according to claim 35 wherein the cone-simulating color space comprises a $(V_l, V_m, V_s)$ color space.

38. A method according to claim 35 and wherein said providing comprises of transforming the output of the employing from the cone-simulating color space to a second color space.

39. A method according to claim 38 wherein said second color space comprises an RGB space.

40. A method according to claim 31 wherein receiving comprises at least partially decorrelating signals representing the color image.

41. A method according to claim 40 wehrein said decorrelating comprises performing a Karhunen-Loeve transform.

42. A method according to claim 41 wherein the providing comprises performing an inverse of the Karhunen-Loeve transform.

43. A color image enhancement method according to claim 31 and wherein said high spatial frequency components comprise the top half of the spatial frequency range of the color image.

44. A color image enhancement method according to claim 31 and wherein said high spatial frequency components comprise the top third of the spatial frequency range of the color image.

45. A color image enhancement method according to claim 31 and wherein said high spatial frequency components comprise the top quarter of the spatial frequency range of the color image.

46. A color image enhancement method according to claim 31 and wherein the power spectrum of said high spatial frequency chromatic components is similar to that of a high spatial frequency achromatic component of said color image.

47. A method according to claim 31 wherein said image processing comprises enhancing chromatic differences between spatially adjacent colors.

48. A method according to claim 47 and also comprising enhancing in the presence of noise comprising enhancing primarily a low spatial frequency portion of an achromatic component of the color image.

49. A method according to claim 47 wherein said enhancing chromatic differences comprises enhancing chromatic differences between spatially adjacent colors which are achromatically indifferentiable.

50. A method according to claim 47 wherein said enhancing chromatic differences comprises enhancing chromatic differences between spatially adjacent colors which are achromatically differentiable.

51. A method according to claim 47 and also comprising enhancing primarily a high spatial frequency portion of an achromatic component of the color image.

52. A method according to claim 31 wherein said employing comprises enhancing said high spatial frequency chromatic components.

53. A color image enhancement method comprising:
   image processing which directly operates on the high spatial frequency chromatic components of a color image.

54. A method according to claim 53 wherein said image processing comprises enhancing said high spatial frequency chromatic components.

55. A color image enhancement method comprising:
   image processing which directly operates on the high spatial frequency chromatic components of a color image,
   whereby a resulting enhanced color image is produced at least mainly from said high spatial frequency components.

56. A method according to claim 55 wherein said image processing comprises enhancing said high spatial frequency chromatic components.

57. A color image enhancement method for modifying a color image for perception by a color-blind individual, the method comprising:
   receiving signals representing the color image;
   image processing the color image, comprising employing the received signals for modifying the color image such that at least one color in the color image which a color-blind individual cannot differentiate is transformed to at least one color which a color-blind individual can differentiate: and
   providing a color image from the output of said apparatus for image processing,
   wherein said image processing comprises enhancing the high spatial frequency chromatic components of the color image.

58. A method according to claim 57 and also comprising identifying colors which the color-blind individual does not differentiate.

59. A method according to claim 57 wherein said employing comprises employing the received signals for modifying the color image such that a color in the color image which a dichromate does not differentiate is transformed to at least one color which the dichromate can differentiate.

60. A method according to claim 57 wherein said employing comprises employing the received signals for modifying the color image such that at least one color in the color image which a monochromate does not differentiate is transformed to a color which the monochromate can differentiate.

* * * * *